United States Patent Office 3,067,203
Patented Dec. 4, 1962

3,067,203
TETRAHYDROISOQUINOLINE DERIVATIVES AND PROCESS FOR THE MANUFACTURE THEREOF
Hedwig Besendorf, Basel, Arnold Brossi, Riehen, and Otto Schnider, Basel, Switzerland, assignors to Hoffmann-La Roche Inc., Nutley, N.J., a corporation of New Jersey
No Drawing. Filed Aug. 25, 1959, Ser. No. 835,820
Claims priority, application Switzerland Sept. 4, 1958
9 Claims. (Cl. 260—289)

This invention relates to tetrahydroisoquinoline derivatives and a process for the manufacture thereof. More particularly, the invention relates to compounds represented by the following structural formula

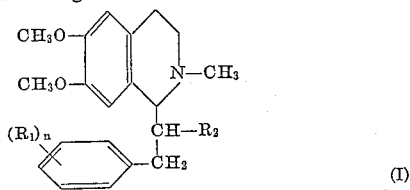
(I)

wherein $R_1$ represents halogen, such as fluorine, chlorine or bromine, $R_2$ represents hydrogen or lower alkyl, such as methyl, ethyl, n-propyl, isopropyl, n-butyl, isobutyl, amyl and the like, and $n$ represents an integer from 1 to 3.

Medicinally acceptable acid addition salts of compounds of Formula I are also included in the invention.

A preferred group of compounds falling within the group represented by Formula I are those represented by the following formula

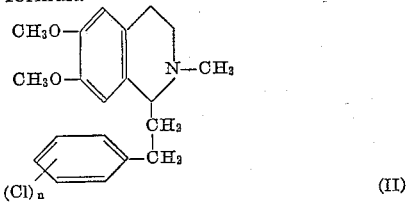
(II)

wherein $n$ has the same significance as above.

The present invention further provides a process for the manufacture of compounds of Formula I. In a first stage of the said process 1-alkanoyl-2-(2-acylamidoethyl)-4,5-dimethoxy-benzenes of the formula:

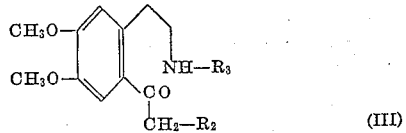
(III)

wherein $R_2$ has the same significance as in Formula I, and $R_3$ represents acyl, are condensed with an appropriately halogenated benzaldehyde having the following formula:

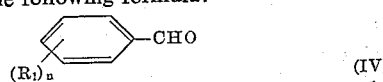
(IV)

wherein $R_1$ and $n$ have the same meaning as in Formula I, to obtain a styryl ketone of the formula

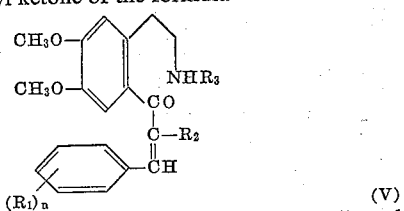
(V)

wherein the symbols have the same significance indicated above.

This reaction is conveniently effected in the presence of an alkaline condensation agent, such as alkali metal amide, alkali metal alcoholate or aqueous alkali metal hydroxide, and in the presence of a solvent, preferably in the presence of a solvent which is miscible with water, such as tetrahydrofurane, dioxane or a lower alcohol such as methanol. The styryl ketones are easily obtained as crystalline compounds.

In the second stage of the comprehensive process, treatment of the above ketones with an acidic agent, such as mineral acid or phosphorus oxychloride, if desired in the presence of an inert organic solvent, such as acetic acid or benzene, effects removal of the N-acyl group and ring-closure to produce a 1-styryl-3,4-dihydroisoquinoline of the following formula:

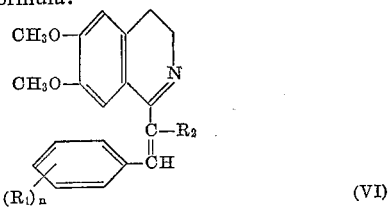
(VI)

wherein the symbols have the same meaning as in Formula I.

The cyclisation is conveniently effected by heating the styryl ketones in dilute hydrochloric acid under reflux in the presence of acetic acid. The mineral acid addition salts of the 1-styryl-3,4-dihydro-isoquinolines usually crystallize after cooling and standing. If this is not the case, crystallisation can be brought about by treating the salts with an appropriate solvent such as acetone. Crystalline cyclization products may even be obtained by simply acidifying the alkaline solution of the first stage and boiling and subsequent cooling of the cyclization mixture.

In the third stage of the process reduction of the 1-styryl-3,4-dihydroisoquinoline represented by Formula VI produces a compound of Formula I wherein the methyl group attached to the secondary nitrogen is absent and is replaced by hydrogen. The reduction may be effected catalytically at ambient temperature, e.g. in the presence of a metal catalyst such as nickel or a noble metal, such as platinum or palladium. For example, a mineral acid salt of the dihydroisoquinoline compound may be hydrogenated in alcoholic solution in the presence of the metal catalyst. The reduction may also be effected stagewise. The dihydroisoquinoline compound, either in the form of the free base or mineral acid salt, may first be treated with an alkali metal-metal hydride, such as lithium aluminum hydride or sodium borohydride in alcoholic solution to obtain the corresponding 1-styryl-1,2,3,4-tetrahydroisoquinoline. The latter is then further reduced, preferably with hydrogen in the presence of a metal catalyst, e.g. in alcoholic solution in the presence of a metal catalyst, such as Adams-catalyst.

If 1-styryl-3,4-dihydroisoquinolines are reduced, which possess an alkyl substituent in α-position of the styryl radical, then corresponding α-alkylated 1-phenethyl-1,2,3,4-tetrahydroisoquinolines are obtained exhibiting two asymmetric carbon atoms giving rise to two racemates. These racemates may be separated, if desired, by fractional crystallization or chromatography.

The methylation of the secondary nitrogen atom is effected in the last stage of the process thereby yielding the products corresponding to Formula I. The methylation takes place preferably by reacting the free base in aqueous solution with formaldehyde and hydrogenating the reaction product in the presence of a hydrogenation catalyst, such as Raney nickel.

The 1-phenethyl-1,2,3,4-tetrahydroisoquinolines of Formula I are basic, for the most part crystalline, compounds. They form crystalline acid addition salts such as sulfate, phosphate, hydrohalide, e.g. hydrochloride, hydrobromide, etc., tartrate, citrate, malate, fumarate, ascorbate, etc., by reaction with the appropriate inorganic or organic acid. The acid salt may be converted to the free base, e.g. by neutralization with an alkali metal hydroxide.

The compounds of this invention are useful as analgesics and antispasmodics. They may be administered orally or parenterally in the form of tablets, capsules, syrups, injectables and the like by incorporating the free base or a medicinally acceptable acid addition salt thereof in therapeutic dosage together with appropriate excipients or vehicles according to conventional practice.

The 1-styryl-3,4-dihydroisoquinolines of Formula VI which are reduced and methylated to obtain the products of this invention are novel compounds. They may be produced from a 1-alkyl-6,7-dimethoxy-3,4-dihydroisoquinoline of the formula

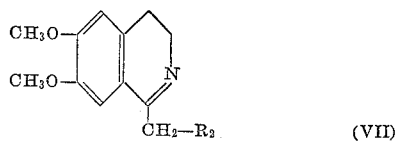

wherein $R_2$ is the same as in Formula I, by acylating with an aliphatic acid anhydride or aromatic acid anhydride in dry pyridine to obtain

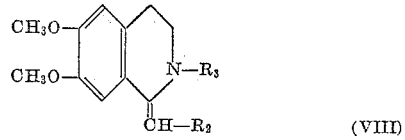

wherein $R_2$ is the same as in Formula I, and $R_3$ represents acyl, then treating the latter with a dilute mineral acid such as hydrochloric acid to open the heterocyclic ring and produce the 1 - alkanoyl - 2 - (2-acylamido-ethyl)-4,5-dimethoxy-benzene of the Formula III.

The compounds of Formula VII may in turn be prepared from homoveratrylamine by N-acylation and subsequent ring closure of the N-acyl-homoveratrylamine according to Bischler-Napieralski [as described in Elderfield, Heterocyclic Compounds, vol. IV, (Wiley, New York, 1952), pages 347 to 353].

The following examples are illustrative of the invention. All temperatures are stated in degrees centigrade.

*Example 1*

54 g. of 1-methyl-6,7-dimethoxy-3,4-dihydroisoquinoline were dissolved in 270 ml. of a mixture of pyridine-acetic anhydride (1:1) and kept for 3 hours on a water bath. The mixture was then evaporated to dryness under water vacuum. The residue was boiled with ethyl acetate to obtain 1-methylene-2-acetyl-6,7-dimethoxy-1,2,3,4-tetrahydroisoquinoline, M.P. 107–108°.

26 g. of 1-methylene-2-acetyl-6,7-dimethoxy-1,2,3,4-tetrahydroisoquinoline were dissolved in 50 ml. of 3 N hydrochloric acid while warming gently. The resulting yellow solution was cooled with ice water, then made alkaline with potassium carbonate. After filtering and drying, 2 - (2 - acetamidoethyl)-4,5-dimethoxy-acetophenone was obtained as the product. The product was dissolved and purified from ethyl acetate, M.P. 124°.

81 g. of 2 - (2 - acetamidoethyl) - 4,5-dimethoxy-acetophenone and 42 g. of p-chlorobenzaldehyde were dissolved in 250 ml. of methanol while warming slightly. 30 ml. of 3 N sodium hydroxide solution were added. Water was added until the solution became turbid and then left to stand for about 30 minutes. The product, 2-(2 - acetamidoethyl) - 4,5 - dimethoxy - (4 - chlorobenzylidene)-acetophenone, was separated by filtration, washed with water and dried, M.P. 155°, U.V. absorption maxima in ethanol at 226 and 308 m$\mu$ ($\epsilon$=15,800 and 25,100).

By the same procedure described above, the following compounds were produced:

2 - (2 - acetamidoethyl) - 4,5 - dimethoxy - (2 - chlorobenzylidene)-acetophenone, M.P. 132°; U.V. absorption maxima in ethanol at 222 and 284 m$\mu$ ($\epsilon$=14,500 and 17,900);

2 - (2 - acetamidoethyl) - 4,5 - dimethoxy - (3,4 - dichlorobenzylidene)-acetophenone, M.P. 160°; U.V. absorption maxima in ethanol at 234 and 299 m$\mu$ ($\epsilon$=16,000 and 20,400);

2 - (2 - acetamidoethyl) - 4,5 - dimethoxy - (3 - chlorobenzylidene)-acetophenone, M.P. 135°; U.V. absorption maxima in ethanol at 232 and 294 m$\mu$ ($\epsilon$=11,100 and 15,000);

2 - (2 - acetamidoethyl) - 4,5 - dimethoxy - (2,4 - dichlorobenzylidene)-acetophenone, M.P. 150°; U.V. absorption maxima in ethanol at 242 and 319 m$\mu$ ($\epsilon$=12,100 and 14,600).

105 g. of 2 - (2 - acetamidoethyl)-4,5-dimethoxy-(4-chlorobenzylidene)-acetophenone were dissolved in 100 ml. of glacial acetic acid, 720 ml. of 20% hydrochloric acid were added and the mixture was boiled under reflux for one hour. Upon cooling, the mixture was filtered under suction. The solid material remaining on the filter was dried, then dissolved and crystallized from methanol-ether (90% methanol). Golden yellow crystals of 1-(4-chlorostyryl)-6,7-dimethoxy-3,4-dihydroisoquinoline hydrochloride were obtained; M.P. 196°; U.V. absorption maxima in ethanol at 236 and 340 m$\mu$ ($\epsilon$=15,600 and 17,000).

By the same procedure, the following additional compounds were obtained:

1 - (2 - chlorostyryl)-6,7-dimethoxy-3,4-dihydroisoquinoline hydrochloride, M.P. 200°; U.V. absorption maxima in ethanol at 241 and 331 m$\mu$ ($\epsilon$=10,100 and 17,000);

1 - (3,4 - dichlorostyryl) - 6,7-dimethoxy-3,4-dihydroisoquinoline hydrochloride, M.P. 165–162°; U.V. absorption maxima in ethanol at 240 and 335 m$\mu$ ($\epsilon$=13,700 and 18,700);

1 - (3 - chlorostyryl)-6,7-dimethoxy-3,4-dihydroisoquinoline hydrochloride, M.P. 200°; U.V. absorption maximum in ethanol at 325 m$\mu$ ($\epsilon$=17,100);

1 - (2,4 - dichlorostyryl) - 6,7-dimethoxy-3,4-dihydroisoquinoline hydrochloride, M.P. 216°; U.V. absorption maxima in ethanol at 242 and 319 m$\mu$ ($\epsilon$=12,100 and 14,600).

95 g. of 1-(4-chlorostyryl)-6,7-dimethoxy-3,4-dihydroisoquinoline hydrochloride were dissolved in 3.5 liters of 80% methanol and hydrogenated in the presence of 500 mg. of platinum oxide. Two molecular proportions of hydrogen were absorbed. After separating the catalyst by filtration, the reaction product was concentrated, then boiled with acetone. 1-(4-chlorophenethyl)-6,7-dimethoxy-1,2,3,4-tetrahydroisoquinoline hydrochloride was obtained as the product; M.P. 238°; U.V. absorption maximum in ethanol at 283 m$\mu$ ($\epsilon$=3800). The hydrochloride was dissolved in water and neutralized with sodium carbonate solution. The free base crystallized upon standing. The 1-(4-chlorophenethyl)-6,7-dimethoxy-1,2, 3,4-tetrahydroisoquinoline was dissolved and crystallized from isopropyl ether, M.P. 69–70°.

By the same procedure as above, the following compounds were produced:

1 - (2-chlorophenethyl)-6,7-dimethoxy-1,2,3,4-tetrahydroisoquinoline hydrochloride, M.P. 189°;

1 - (3,4 - dichlorophenethyl)-6,7-dimethoxy-1,2,3,4-tetrahydroisoquinoline hydrochloride, M.P. 230°;

1 - (3-chlorophenethyl)-6,7-dimethoxy-1,2,3,4-tetrahydroisoquinoline hydrochloride, M.P. 203–205°;

1 - (2,4-dichlorophenethyl)-6,7-dimethoxy-1,2,3,4-tetrahydroisoquinoline hydrochloride, M.P. 250°;

1 - (4-bromophenethyl)-6,7-dimethoxy-1,2,3,4-tetrahydroisoquinoline hydrochloride, M.P. 233–235°;

1 - (4-fluorophenethyl)-6,7-dimethoxy-1,2,3,4-tetrahydroisoquinoline hydrochloride, M.P. 227–229°;

60 g. of 1-(4-chlorophenethyl)-6,7-dimethoxy-1,2,3,4-tetrahydroisoquinoline were dissolved in 250 ml. of methanol and 20 ml. of a 38% aqueous formaldehyde solution were added. After standing for 2 hours at room temperature, the reaction mixture was hydrogenated in the presence of 10 g. of Raney nickel catalyst. 7.5 liters of hydrogen were absorbed. After separating the catalyst by filtration, the filtrate was concentrated and the crystalline residue was dissolved and precipitated from aqueous methanol. 1 - (4-chlorophenethyl)-2-methyl-6,7-dimethoxy-1,2,3,4-tetrahydroisoquinoline was obtained in the form of colorless leaflets which melted at 110–111°. The free base was dissolved in acetone and alcoholic HCl was added. Upon the addition of ether, 1-(4-chlorophenethyl) - 2 - methyl-6,7-dimethoxy-1,2,3,4-tetrahydroisoquinoline hydrochloride crystallized, M.P. 105–106°, U.V. absorption maxima in ethanol at 283 and 287 m$\mu$ ($\epsilon$=3830). Picrate M.P. 151°.

The following additional compounds were prepared according to the same procedure:

1 - (2-chlorophenethyl)-2-methyl-6,7-dimethoxy-1,2,3,4-tetrahydroisoquinoline hydrobromide, M.P. 164°;

1 - (3,4-dichlorophenethyl)-2-methyl-6,7-dimethoxy-1,2,3,4-tetrahydroisoquinoline, M.P. 94°; hydrochloride M.P. 120°;

1 - (3-chlorophenethyl)-2-methyl-6,7-dimethoxy-1,2,3,4-tetrahydroisoquinoline hydrochloride, M.P. 112°;

1 - (2,4-dichlorophenethyl)-2-methyl-6,7-dimethoxy-1,2,3,4-tetrahydroisoquinoline, M.P. 108°;

1 - (4-bromophenethyl)-2-methyl-6,7-dimethoxy-1,2,3,4-tetrahydroisoquinoline, M.P. 116°;

1 - (4 - fluorophenethyl)-2-methyl-6,7-dimethoxy-1,2,3,4-tetrahydroisoquinoline, M.P. 127–129°; hydrochloride, M.P. 109°.

*Example 2*

7.2 g. of 1-(4-chlorostyryl)-6,7-dimethoxy-3,4-dihydroisoquinoline hydrochloride were dissolved in 300 ml. of 90% methanol while warming slightly. 2 g. of sodium borohydride were added portionwise. The originally orange-red solution became colorless. After concentration, water was added and the reaction mixture was permitted to stand. 1-(4-chlorostyryl)-6,7-dimethoxy-1,2,3,4-tetrahydroisoquinoline crystallized out and was dissolved and recrystallized from methanol-water, M.P. 144°. The product was dissolved in acetone and treated with alcoholic HCl solution. 1-(4-chlorostyryl)-6,7-dimethoxy-1,2,3,4-tetrahydroisoquinoline hydrochloride precipitated in crystalline form upon the addition of ether, M.P. 243°, U.V. absorption maximum of the base in ethanol at 260 m$\mu$ ($\epsilon$=29,000). The product was catalytically hydrogenated in the presence of platinum oxide to obtain 1-(4-chlorophenethyl) - 6,7 - dimethoxy-1,2,3,4-tetrahydroisoquinoline, the same product as described in Example 1.

*Example 3*

21 g. of 1-ethyl-6,7-dimethoxy-3,4-dihydroisoquinoline were dissolved in 50 ml. of dry pyridine. Then 25 ml. of acetic anhydride were added and the mixture was allowed to stand for one hour on a water bath. After concentrating, 1-ethylidene-2-acetyl-6,7-dimethoxy-1,2,3,4-tetrahydroisoquinoline crystallized. It was purified by recrystallization from ethyl acetate/ligroin. The so obtained product of M.P. 99° was dissolved in 100 ml. of 3 N hydrochloric acid while warming gently. After cooling the solution was made alkaline with a saturated solution of sodium carbonate. After filtering and drying, 2-(2-acetamido-ethyl)-4,5-dimethoxy-propiophenone was obtained as the product. It was dissolved and purified from ethyl acetate/ligroin, M.P. 118°.

40 g. of 2-(2-acetamidoethyl)-4,5-dimethoxy-propiophenone were reacted with 20 g. of p-chlorobenzaldehyde according to the procedure described in Example 1 whereby 2-(2-acetamidoethyl)-4,5-dimethoxy-$\alpha$ - (4-chlorobenzylidene)-propiophenone was obtained in quantitative yield, M.P. 126°. After ring closure and hydrogenation according to the procedure described in Example 1, 1-(4-chloro-$\alpha$-methyl-phenethyl) - 6,7-dimethoxy - 1,2,3,4-tetrahydroisoquinoline was isolated in the form of its hydrochloride. The aqueous solution of the hydrochloride was made alkaline and the base extracted with benzene. After evaporation and recrystallization of the residue from isopropylether one of the two racemates was obtained, M.P. 138°. Its hydrochloride was prepared by dissolving the base in acetone and treating the solution with hydrogen chloride; M.P. 203–204° (from ethanol/ether). N-methylation according to the procedure described in Example 1 yielded 1-(4-chloro-$\alpha$-methyl-phenethyl)-2-methyl-6,7-dimethoxy - 1,2,3,4-tetrahydroisoquinoline in the form of one of the two possible racemates, its hydrobromide having a M.P. of 194°, U.V. absorption maximum in ethanol at 283 m$\mu$ ($\epsilon$= 3830).

We claim:

1. A compound selected from the group consisting of bases represented by the formula

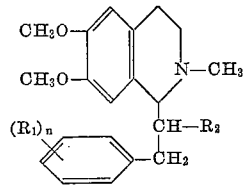

wherein $R_1$ represents halogen, $R_2$ represents a member of the group consisting of hydrogen and lower alkyl, and $n$ represents an integer from 1 to 3, and medicinally acceptable acid addition salts thereof.

2. A compound represented by the formula

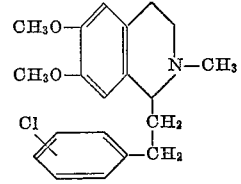

3. A compound represented by the formula

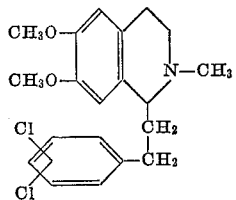

4. 1-(4-chlorophenethyl)-2-methyl-6,7 - dimethoxy-1,2,3,4-tetrahydroisoquinoline.

5. 1-(4-chlorophenethyl)-2 - methyl - 6,7-dimethoxy-1,2,3,4-tetrahydroisoquinoline hydrochloride.

6. 1-(3,4-dichlorophenethyl)-2-methyl - 6,7-dimethoxy-1,2,3,4-tetrahydroisoquinoline.

7. 1-(3,4-dichlorophenethyl) - 2-methyl-6,7-dimethoxy-1,2,3,4-tetrahydroisoquinoline hydrochloride.

8. A process for the manufacture of a compound represented by the formula

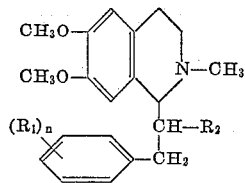

wherein $R_1$ represents halogen, $R_2$ represents a member of the group consisting of hydrogen and lower alkyl, and $n$ represents an integer from 1 to 3, which comprises condensing a 1-alkanoyl-2-(2-acylamidoethyl)-4,5-dimethoxy-benzene with a halogenated benzaldehyde in a water miscible solvent in the presence of an alkaline condensation agent, cyclizing the substituted styryl ketone obtained to a substituted 1-styryl-3,4-dihydroisoquinoline by heating with an acidic agent, catalytically reducing the latter and N-methylating the substituted 1-phenethyl-1,2,3,4-tetrahydroisoquinoline formed by reacting with formaldehyde and reducing.

9. 1-(4-fluorophenethyl)-2-methyl-6,7-dimethoxy - 1,2, 3,4-tetrahydroisoquinoline.

References Cited in the file of this patent
UNITED STATES PATENTS

| | | |
|---|---|---|
| 2,683,146 | Robinson | July 6, 1954 |
| 2,683,713 | Shepard | July 13, 1954 |
| 2,721,212 | Black | Oct. 18, 1955 |
| 2,721,213 | Mooradian | Oct. 18, 1955 |

OTHER REFERENCES

Craig et al.: Journal American Chemical Society, vol. 70, pages 2783–85 (1948).

Govindachari et al.: Indian Academy of Science, vol. 42, pp. 136–141 (1955).

UNITED STATES PATENT OFFICE
CERTIFICATE OF CORRECTION

Patent No. 3,067,203                      December 4, 1962

Hedwig Besendorf et al.

It is hereby certified that error appears in the above numbered patent requiring correction and that the said Letters Patent should read as corrected below.

Column 4, line 42, for "165-162°" read -- 160-162° --.

Signed and sealed this 3rd day of September 1963.

(SEAL)
Attest:

ERNEST W. SWIDER
Attesting Officer

DAVID L. LADD
Commissioner of Patents